United States Patent
Boers et al.

(10) Patent No.: US 8,116,310 B2
(45) Date of Patent: Feb. 14, 2012

(54) REDUCING PACKET FLOODING BY A PACKET SWITCH

(75) Inventors: Arjen Boers, Sitges (ES); IJsbrand Wijnands, Leuven (BE); Giovanni Meo, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 11/986,583

(22) Filed: Nov. 24, 2007

(65) Prior Publication Data

US 2009/0135722 A1  May 28, 2009

(51) Int. Cl.
*H04L 12/28* (2006.01)
(52) U.S. Cl. ...................................................... 370/389
(58) Field of Classification Search .................. 370/229, 370/230, 235, 236, 389, 390, 392, 395.31, 370/400, 401, 432, 474, 351, 252
See application file for complete search history.

(56) References Cited

U.S. PATENT DOCUMENTS

| | | |
|---|---|---|
| 6,256,314 B1 * | 7/2001 | Rodrig et al. ................. 370/401 |
| 6,847,638 B1 * | 1/2005 | Wu et al. ....................... 370/389 |
| 2008/0069100 A1 * | 3/2008 | Weyman et al. .............. 370/390 |

OTHER PUBLICATIONS

Wu et al., "Router-port Group Management Protocol (RGMP)," Feb. 2003, RFC 3488, The Internet Society, pp. 1-17.
Liao et al, "Received-Initiated Group Membership Protocol (RGMP): A New Group Management Protocol for IP Multicasting," IEEE Transactions on Broadcasting, vol. 50, No. 3 Sep. 2004, pp. 279-288.

* cited by examiner

*Primary Examiner* — Kwang B Yao
*Assistant Examiner* — Anh Ngoc Nguyen
(74) *Attorney, Agent, or Firm* — The Law Office of Kirk D. Williams (57) ABSTRACT

Disclosed are, inter alia, methods, apparatus, computer-readable media, mechanisms, and means for reducing packet flooding by a packet switch. A packet switch receives a flood prevention request message from an upstream router, with this message identifying a forwarding media access control (MAC) address and one or more destination MAC addresses of downstream routers. The packet switch looks up, typically in its forwarding data structure(s), these specified MAC addresses of the downstream routers in order to determine its corresponding ports on which to communicate with these MAC addresses. The packet switch updates its forwarding data structures accordingly such that a received multicast packet having as its destination MAC address the received forwarding MAC address will be forwarded out only these determined ports.

16 Claims, 7 Drawing Sheets

REDUCING PACKET FLOODING BY A PACKET SWITCH

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

An often-used configuration in a network is to connect multiple Layer-3 routers via a packet switch (e.g., a Layer-2 bridge). In such a configuration, a multicast packet sent from a router to one or more other routers via the bridge are often sent out each of the ports of the router, except the port on which the multicast packet was received. A "packet flooding" condition is created when the packet is sent out of one or more ports of the packet switch on which no router receiving the packet needs the packet. This condition can consume, and waste, a large amount of resources of the packet switch and routers. Wu et al., U.S. Pat. No. 6,847,638, issued Jan. 25, 2005, hereby incorporated by reference in its entirety, presents one approach that may reduce packet flooding. Needed are additional approaches.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-readable media, mechanisms, and means for reducing packet flooding by a packet switch.

In one embodiment, a packet switch receives a flood prevention request message from an upstream router, with this message identifying a forwarding media access control (MAC) address and one or more destination MAC addresses of downstream routers. The packet switch looks up, typically in its forwarding data structure(s), these specified MAC addresses of the downstream routers in order to determine its corresponding ports on which to communicate with these MAC addresses. The packet switch updates its forwarding data structures accordingly such that a received multicast packet having as its destination MAC address the received forwarding MAC address will be forwarded out only these determined ports.

2. Description

Disclosed are, inter alia, methods, apparatus, computer-readable media, mechanisms, and means for reducing packet flooding by a packet switch.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. Additionally, these packets may contain one or more types of information, including, but not limited to, voice, data, video, and audio information.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

In one embodiment, a packet switch receives a flood prevention request message from an upstream router, with this message identifying a forwarding media access control (MAC) address and one or more destination MAC addresses of downstream routers. The packet switch looks up, typically in its forwarding data structure(s), these specified MAC addresses of the downstream routers in order to determine its corresponding ports on which to communicate with these MAC addresses. The packet switch updates its forwarding data structures accordingly such that a received multicast packet having as its destination MAC address the received forwarding MAC address will be forwarded out only these determined ports.

One embodiment is performed by a packet switch having multiple ports for communicating with multiple routers. The packet switch receives a flood prevention request message from an upstream router on one of the ports. An upstream router is a router in a multicast distribution tree that is to distribute packets to multiple downstream routers. This flood prevention request message identifies a forwarding media access control (MAC) address and one or more destination MAC addresses. This received forwarding MAC address refers to the MAC address to which a multicast packet to be subsequently received is addressed and is to be forwarded to the routers identified by the received one or more destination MAC addresses. In response to the receipt of the flood prevention request message, the packet switch determines based on said one or more destination MAC addresses, which ports these particular packets should be forwarded from by the packet switch in order to reach the routers defined by the one or more destination MAC addresses, and the packet switch updates one or more of its forwarding data structures correlating the forwarding MAC address with these determined ports. Subsequently, in response to receiving a particular packet including the forwarding MAC address as its destination address: performing one or more lookup operations on the forwarding data structures based on the forwarding MAC address to identify the set of ports from which to forward the particular packet, and forwarding the particular packet from each of these determined ports. In one embodiment, there is only one port from which the packets are forwarded. In one embodiment, packets are forwarded from two or more ports.

One embodiment includes a packet switch. The packet switch includes multiple ports for communicating with multiple routers. The packet switch includes means for receiving a flood prevention request message from an upstream router on one of the ports, the flood prevention request message identifying a forwarding media access control (MAC) address and one or more destination MAC addresses, the forwarding MAC address identifying a MAC address to be subsequently received in each of multiple particular packets and said one or more destination MAC addresses identifying MAC addresses to which these particular packets including the forwarding MAC address should be forwarded by the packet switch. The packet switch includes means for determining based on said one or more destination MAC addresses, which one or more ports but less than all of the ports the particular packets should be forwarded from by the packet switch in order to reach the desired routers, and updating one or more forwarding data structures within the packet switch correlating the forwarding MAC address with the determined one or more ports but less than all of the plurality of ports. The packet switch includes means for receiving each of the packets including the forwarding MAC address; means for performing one or more lookup operations on the forwarding data structures based on the forwarding MAC address to identify the previously determined ports; and means for forwarding each of the packets from the determined ports. In one embodiment, there is only one port from which the packets are forwarded. In one embodiment, packets are forwarded from two or more ports.

One embodiment is performed in a network, with the network including: an upstream router, a packet switch, a plurality of downstream routers and one or more additional routers, with the router being communicatively coupled to the plurality of downstream routers via the packet switch, the packet switch including a first port, a plurality of second ports and one or more additional ports for communicating with external devices, the packet switch being communicatively coupled to the upstream router via the first port, the packet switch being communicatively coupled to the plurality of downstream routers via said second ports, and the packet switch being communicatively coupled to said additional routers via said additional ports. One embodiment includes a method performed in a network, with this method comprising: the upstream router, in response to recognizing that multicast traffic is to be sent to each of the plurality of downstream routers, sending a flood prevention request message to the packet switch, the flood prevention request message identifying a forwarding media access control (MAC) address and a plurality of destination MAC addresses, the forwarding MAC address identifying a MAC address to be subsequently received in each of a plurality of particular packets and the plurality of destination MAC addresses identifying MAC addresses of the plurality of downstream routers; the packet switch, in response to said receipt of the flood prevention request message, determining based on said plurality of destination MAC addresses, the plurality of second ports is the set of ports that the plurality of particular packets including the forwarding MAC address should be forwarded from by the packet switch, and updating one or more forwarding data structures within the packet switch correlating the forwarding MAC address with said determined plurality of second ports; and for each particular packet of the plurality of particular packets: receiving said particular packet including the forwarding MAC address as its destination address; performing one or more lookup operations on said one or more forwarding data structures based on the forwarding MAC address to identify the plurality of second ports, and forwarding said particular packet from the plurality of second ports to the plurality of downstream routers.

One embodiment includes a method performed by an upstream router in a multicast tree, the method comprising: in response to recognizing that multicast traffic is to be sent to each of a plurality of downstream routers via a same port of the router through a packet switch, sending a flood prevention request message to the packet switch, the flood prevention request message identifying a forwarding media access control (MAC) address and a plurality of destination MAC addresses, the forwarding MAC address identifying a MAC address to be subsequently received in each of a plurality of particular packets and the plurality of destination MAC addresses identifying MAC addresses of the plurality of downstream routers; and sending each particular packet of a plurality of particular packets from the port, said particular packet including as its destination address the forwarding MAC address.

Figure 1:
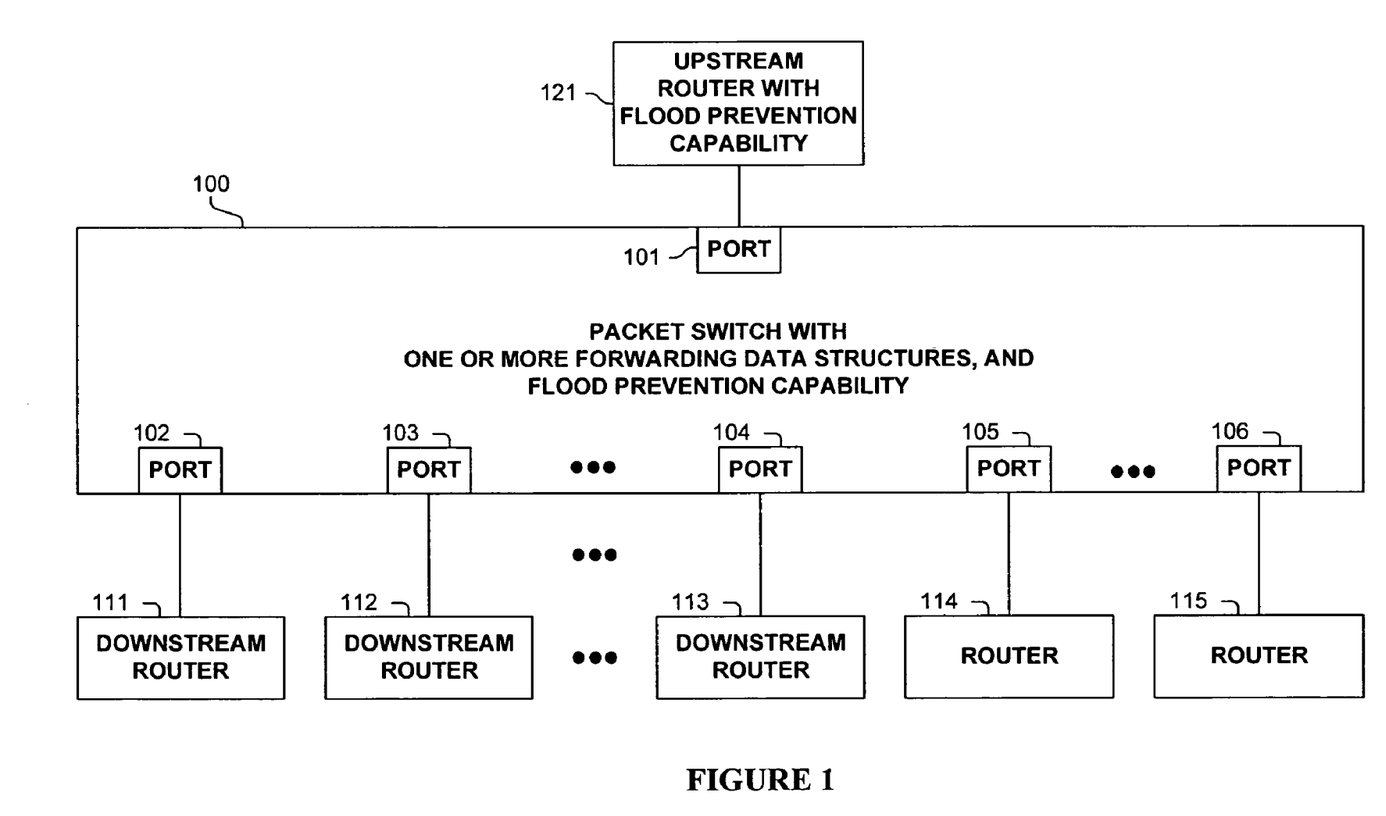
FIG. 1 illustrates an example of networks useful for explaining the operation of one embodiment.

Expressly turning to the figures, FIG. 1 illustrates a packet switch 100 (e.g., a Layer-2 bridge), including one or more forwarding data structures and flood prevention capability, such as that discussed herein. Packet switch 100 also includes ports 101-106 for communicating with routers 111-115 and 121 as illustrated. Router 121 is denoted as an upstream router for a multicast stream, routers 111-113 are denoted as downstream routers for the multicast stream, and routers 114-115 are not denoted as upstream nor downstream as they do not participate in the multicast stream.

In one embodiment, packet switch 100 receives a flood prevention request message from upstream router 121, with this message identifying a forwarding media access control (MAC) address and one or more destination MAC addresses of downstream routers (111-113). Packet switch 100 looks up, in its forwarding data structure(s), these specified MAC addresses of downstream routers (111-113) in order to determine its corresponding ports (102-104) on which to communicate with these MAC addresses/routers. Packet switch 100 updates its forwarding data structure(s) accordingly such that a received multicast packet from upstream router 121 having as its destination MAC address the received forwarding MAC address will be forwarded out only ports 102-104.

Figure 2A:
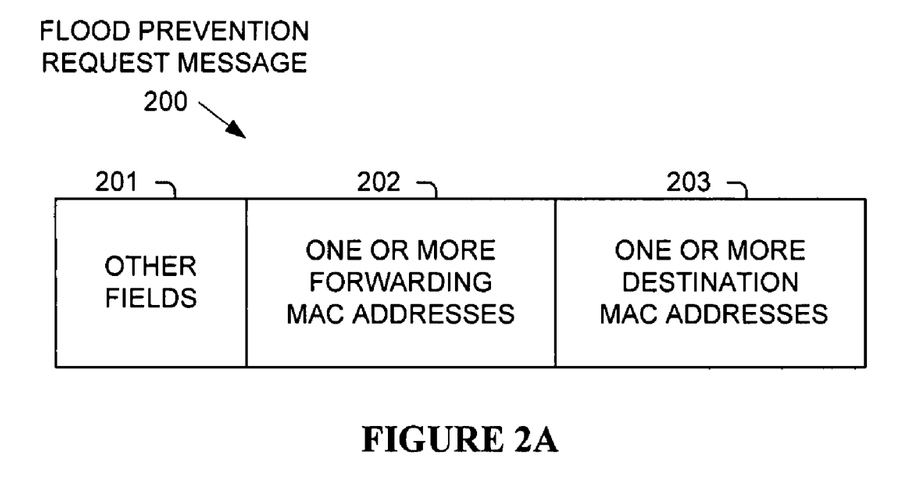
FIGS. 2A and 2B illustrate formats of packets used in one embodiment.

FIG. 2A illustrates a packet format used in one embodiment of flood prevention request message 200. As shown, flood prevention request message 200 includes other fields 201 (e.g., packet header for sending to the packet switch, protocol information, etc.), one or more forwarding MAC addresses 202 and one or more destination MAC addresses 203. In one embodiment, one a single forwarding MAC address is specified in field 202. In one embodiment, a single flood prevention request message 200 defines associations between multiple forwarding MAC addresses and multiple sets of destination MAC addresses.

Figure 2B:
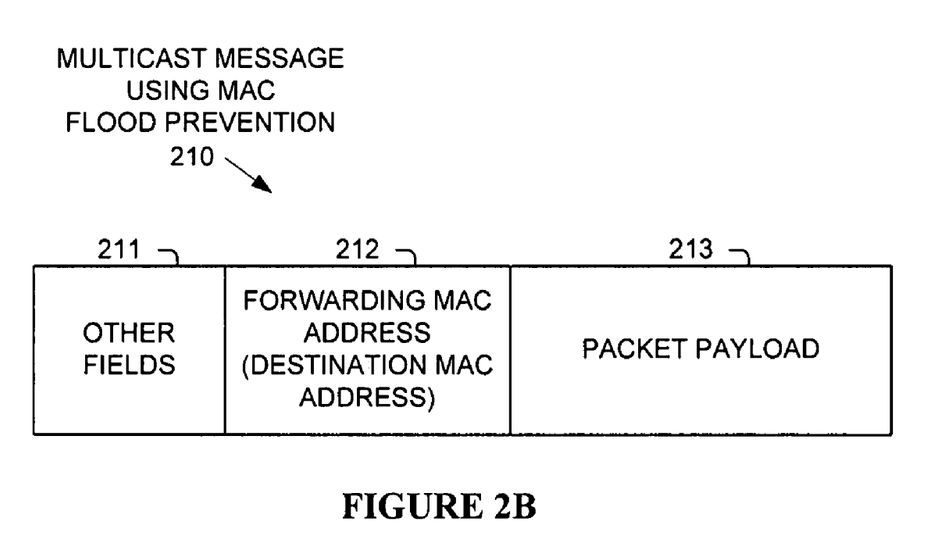

FIG. 2B illustrates a packet format used in one embodiment of a multicast message 210 using MAC flood prevention. As shown, multicast message 210 includes other fields 201 (e.g., standard packet fields such as protocol information, etc.), the forwarding MAC address 212 (as the packet's MAC destination address) previously defined for the multicast packet to the packet switch using a flood prevention request message (e.g., message 200 of FIG. 2A), and the packet payload 213.

Figure 3A:
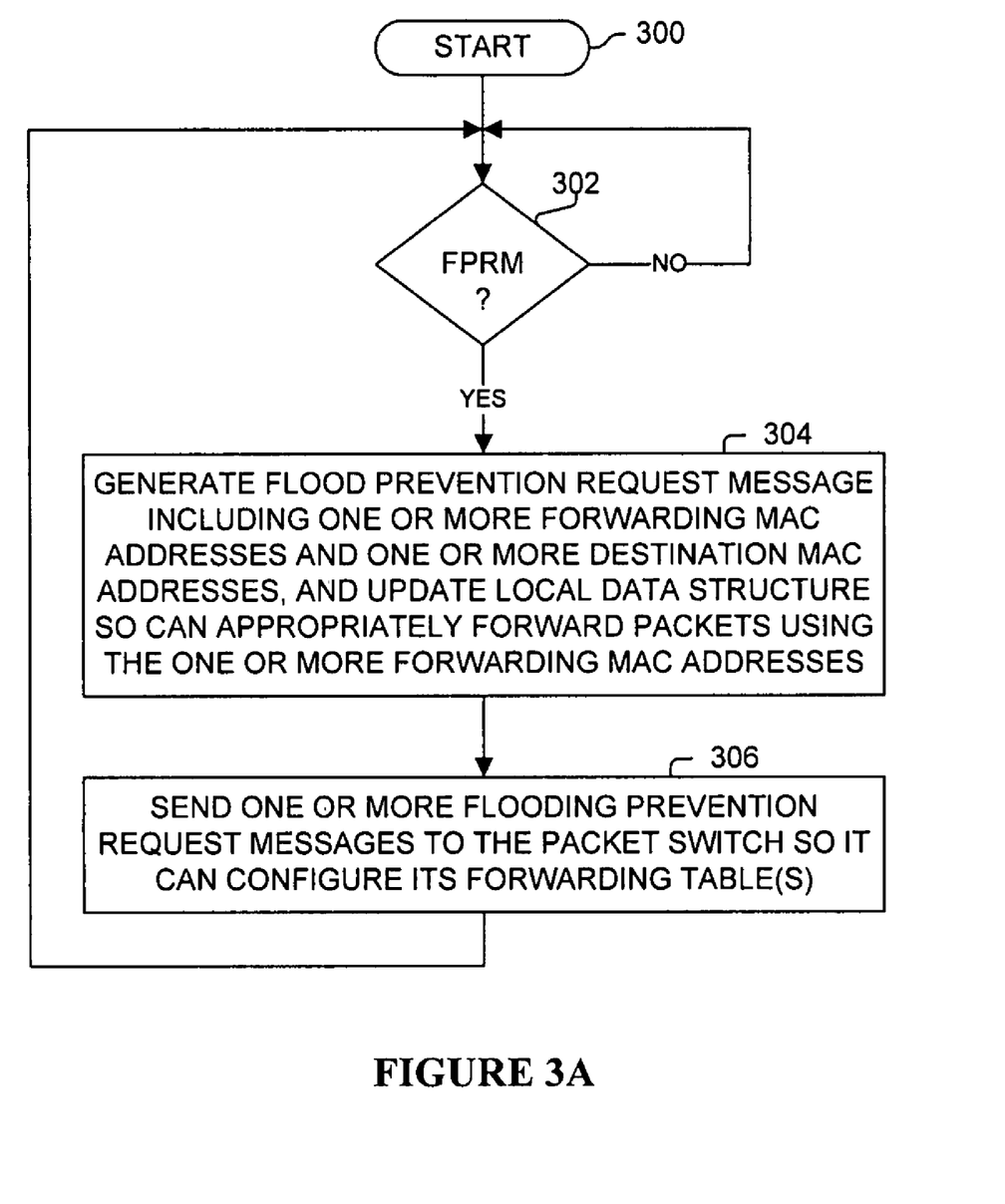
FIGS. 3A, 3B, 4A and 4B each illustrate a process used in one embodiment.

FIG. 3A illustrates a process performed in one embodiment by an upstream router. Processing begins with process block 300. As determined in process block 302, if a flood prevention request message should be sent, then in process block 304, a flood prevention request message is generated, with the message including one or more forwarding MAC addresses and one or more destination MAC addresses. Additionally, the router updates one or more of its local data structures such that multicast packets of the corresponding stream will be sent out using the forwarding MAC address. In process block 306, the flood prevention request message is sent to the corresponding packet switch so it can configure their forwarding tables accordingly. Processing returns to process block 302. Of course, an upstream router can be connected to multiple packet switches, with a same or different forwarding MAC address used to forward packets of a multicast stream to the packet switches, if required by the multicast stream.

Figure 3B:
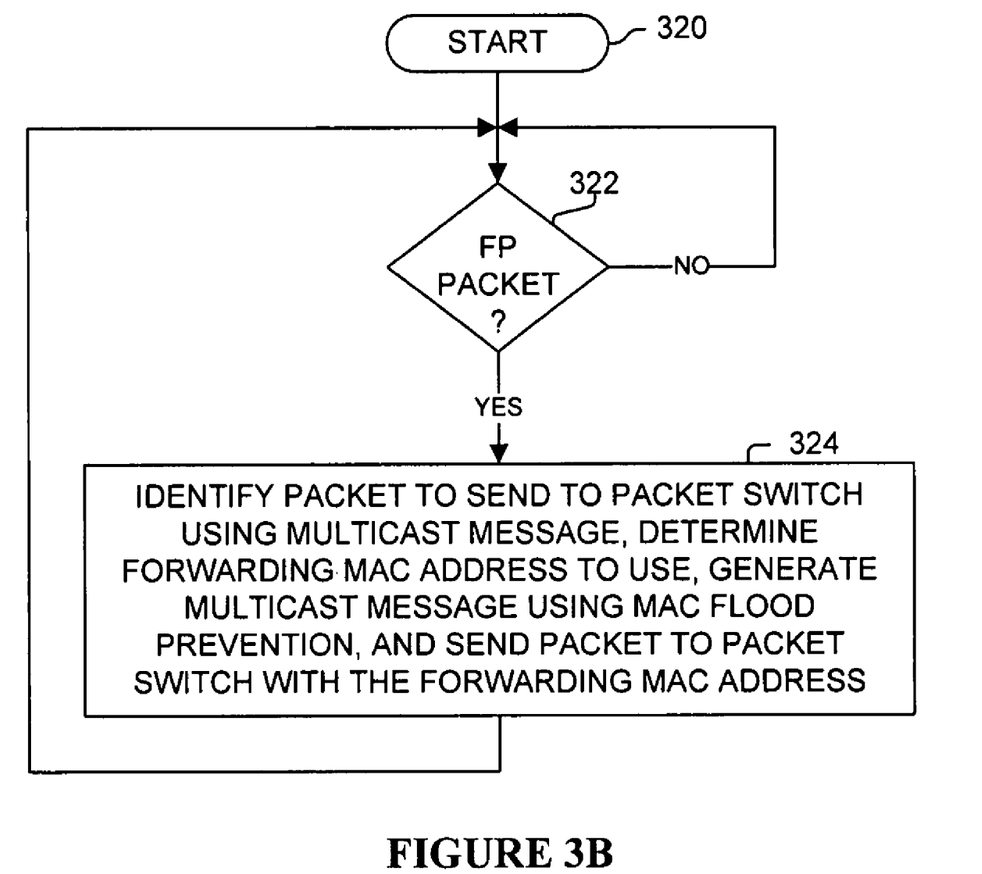

FIG. 3B illustrates a process used in one embodiment by an upstream router for sending multicast packets to packet switches which have been configured based on a forwarding prevention request message. Processing begins with process block 320. As determined in process block 322, if the router has a multicast packet using flood prevention (FP packet) to send, in process block 324, the forwarding MAC address to used is determined, and the packet using the forwarding MAC is generated and sent to the packet switch with the forwarding MAC address as its MAC destination address. Processing returns to process block 322. Of course, an upstream router can be connected to multiple packet switches and if a multicast packet is to be sent to multiple packet switches using flood preventing, the all or some of the processing of process block 324 is repeated for each packet switch.

Figure 4A:
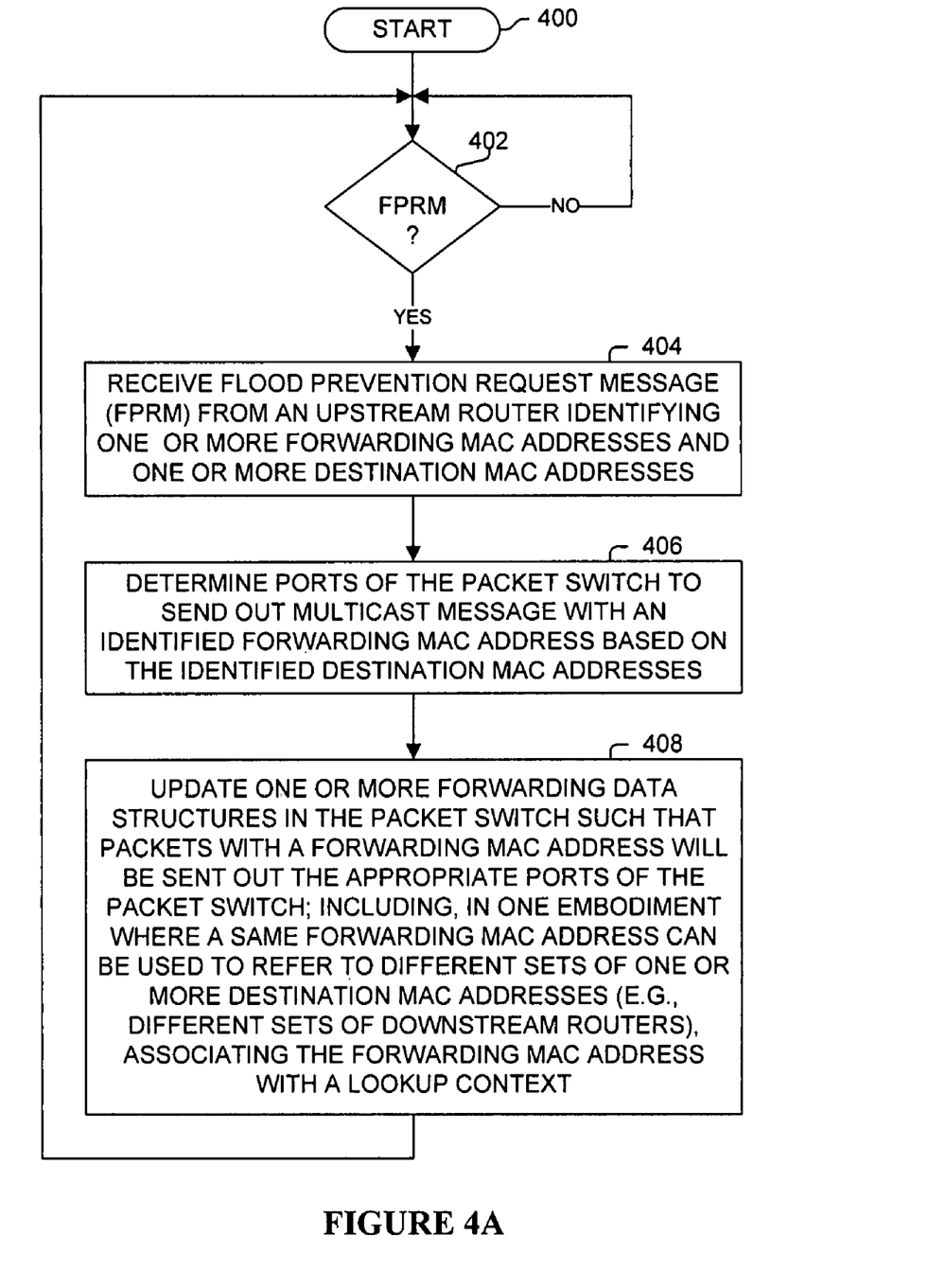

FIG. 4A illustrates a process using in one embodiment by a packet switch using flood prevention. Processing begins with process block 400. As determined in process block 402, if a flood prevention request message (FPRM) (e.g., message 200 of FIG. 2A) has been received, then process block 404 specifies that the flood prevention request message has been received from an upstream router, with this flood prevention request message identifying one or more forwarding MAC addresses and one or more destination MAC addresses. In process block 406, the packet switch determines which of its ports correspond to the one or more destination MAC addresses identified in the received flood prevention request message. In process block 408, the packet switch updates one or more of its forwarding data structures such that a packet received with a forwarding MAC address identified in the received flood prevention request message will be forwarded out the determined appropriate ports of the packet switch. In one embodiment, two different upstream routers use a same forwarding MAC address to refer to different sets of destination MAC addresses (e.g., different sets of downstream routers); and therefore, the packet switch maintains a lookup context (e.g., the source address of the packet, from which router the packet was received, on which port the packet was received, etc.) within its forwarding data structures or uses different forwarding data structures for the different forwarding contexts, so that the forwarding MAC address will be associated with the correct set of ports. Processing returns to process block 402.

Figure 4B:
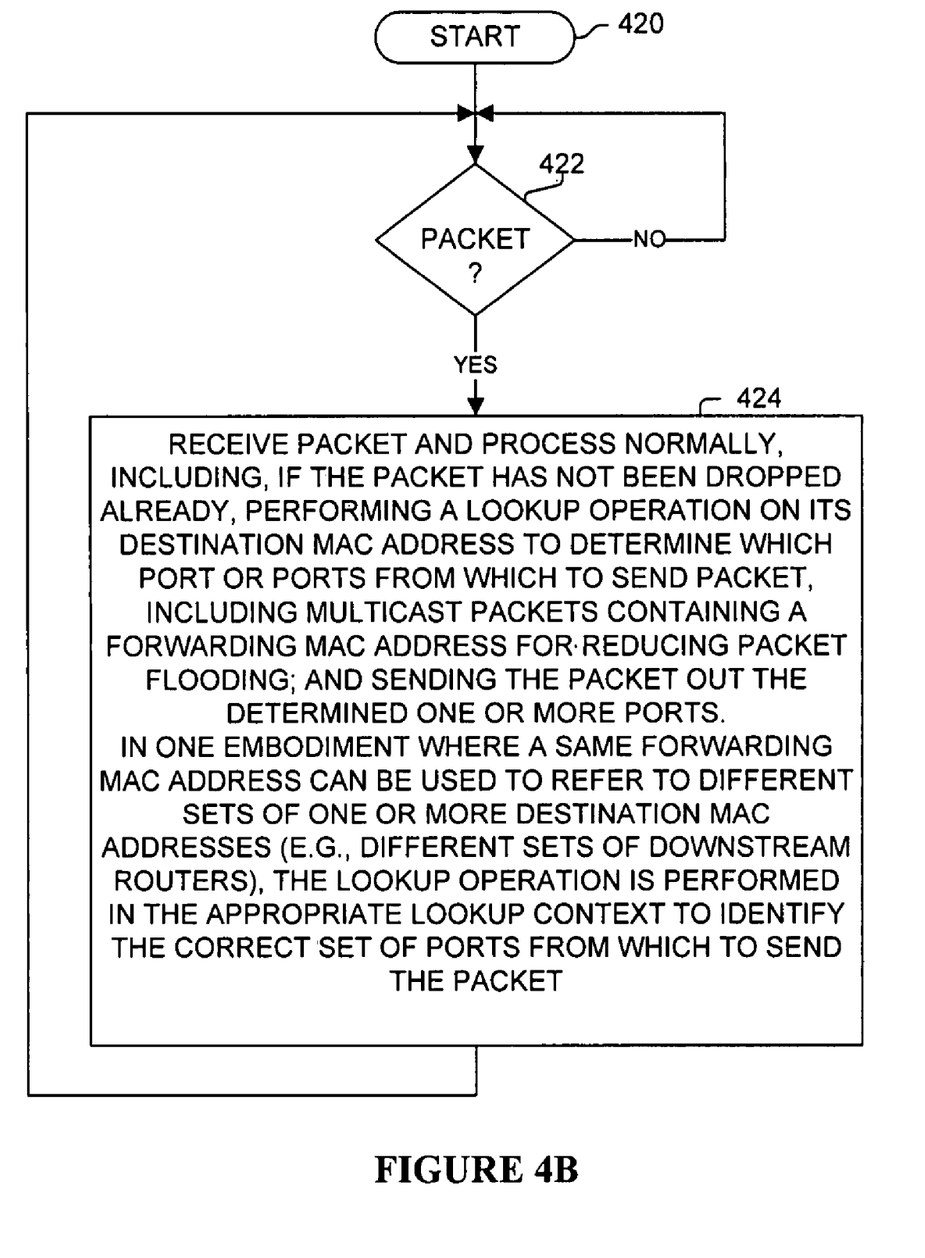

FIG. 4B illustrates a process using in one embodiment by a packet switch using flood prevention. Processing begins with process block 420. As determined in process block 422, if a packet is to be received, then in process block 424, the packet is received and processed normally. This processing typically includes, if the packet has not already been dropped by other processing (e.g., access control, traffic-rate control), then a lookup operation is performed on its MAC destination address and the packet is sent out on or more of its ports. In the case of a multicast packet with a MAC destination address defined to the packet switch in a flood prevention request message, then the packet is sent out the corresponding port(s) based on the MAC addresses of the downstream routers specified in the flood prevention request message. In one embodiment, two different upstream routers use a same forwarding MAC address to refer to different sets of destination MAC addresses (e.g., different sets of downstream routers); and therefore, the packet switch identifies the correct set of port addresses from which to forward the packet based on a lookup operation in the corresponding lookup context in its forwarding data structures. Processing returns to process block 422.

Figure 5:
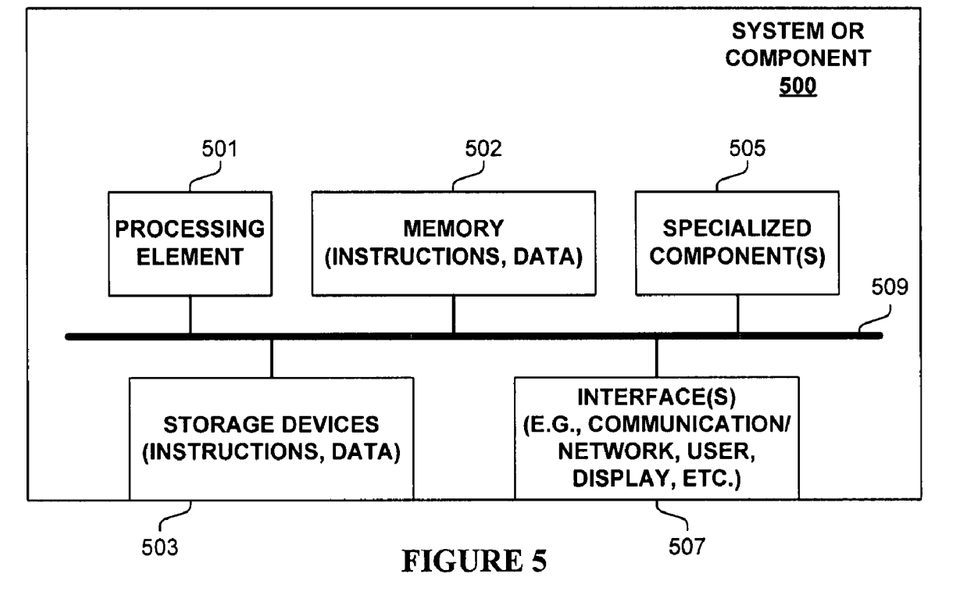
FIG. 5 illustrates an example system or component used in one embodiment.

FIG. 5 is block diagram of a system or component 500 used in one embodiment that measures delays within a packet switching device. In one embodiment, system or component 500 performs one or more processes corresponding to one of the flow diagrams illustrated or otherwise described herein.

In one embodiment, system or component 500 includes a processing element 501, memory 502, storage devices 503, specialized components 505 (e.g. optimized hardware such as for performing lookup operations such as an content-associative memory, etc.), and interfaces 507 for communicating information (e.g., sending and receiving packets, user-interfaces, displaying information, etc.), which are typically communicatively coupled via one or more communications mechanisms 509, with the communications paths typically tailored to meet the needs of the application.

Various embodiments of component 500 may include more or less elements. The operation of component 500 is typically controlled by processing element 501 using memory 502 and storage devices 503 to perform one or more tasks or processes. Memory 502 is one type of computer-readable medium, and typically comprises random access memory (RAM), read only memory (ROM), flash memory, integrated circuits, and/or other memory components. Memory 502 typically stores computer-executable instructions to be executed by processing element 501 and/or data which is manipulated by processing element 501 for implementing functionality in accordance with an embodiment. Storage devices 503 are another type of computer-readable medium, and typically comprise solid state storage media, disk drives, diskettes, networked services, tape drives, and other storage devices. Storage devices 503 typically store computer-executable instructions to be executed by processing element 501 and/or data which is manipulated by processing element 501 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:

operations performed in a network; wherein the network includes an upstream router, a packet switch, a plurality of downstream routers and one or more additional routers; wherein the upstream router is communicatively coupled to the plurality of downstream routers via the packet switch; wherein the packet switch includes a first port, a plurality of second ports and one or more additional ports for communicating with external devices; wherein the packet switch is communicatively coupled to the upstream router via the first port; wherein the packet switch is communicatively coupled to the plurality of downstream routers via said second ports; and wherein the packet switch is communicatively coupled to said additional routers via said additional ports;

wherein said operations include:

the upstream router, in response to recognizing that multicast traffic is to be sent to each of the plurality of downstream routers, sending a flood prevention request message to the packet switch; wherein the flood prevention request message specifies both a forwarding media access control (MAC) address and a plurality of destination MAC addresses; wherein each of the plurality of destination MAC addresses is a MAC address of one of the plurality of downstream routers; wherein the forwarding MAC address is a MAC address to be subsequently used as the destination MAC address in each of a plurality packets; and wherein each of the plurality of destination MAC addresses identifies one of the plurality of downstream routers to which the packet switch should forward each said packet having the forwarding MAC address as its destination MAC address; and the packet switch, in response to said receipt of the flood prevention request message: determining, based on said plurality of destination MAC addresses, the plurality of second ports is the set of ports that a packet having said forwarding MAC address as its destination MAC address should be forwarded from by the packet switch; and updating one or more forwarding data structures within the packet switch correlating the forwarding MAC address with said determined plurality of second ports based on said plurality of destination MAC addresses for use in forwarding subsequently received packets having the forwarding MAC address as their destination address.

2. The method of claim 1, wherein for each particular packet of the plurality of packets: receiving said particular packet including the forwarding MAC address as its destination address by the packet switch; the packet switch performing one or more lookup operations on said one or more forwarding data structures based on the forwarding MAC address to identify the plurality of second ports, and the packet switch forwarding said particular packet from the plurality of second ports to the plurality of downstream routers.

3. A method, comprising:

performing operations by a packet switch; wherein the packet switch includes a plurality of ports for communicating with a plurality of routers and an upstream router;

wherein said operations include:

receiving a flood prevention request message from the upstream router on one of the plurality of ports; wherein the flood prevention request message specifies both a forwarding media access control (MAC) address and a plurality of destination MAC addresses; wherein each of the plurality of destination MAC addresses is a MAC address of one of the plurality of routers; wherein the forwarding MAC address is a MAC address to be subsequently used as the destination MAC address of packets; and wherein each of the plurality of destination MAC addresses identifies one of the plurality routers to which the packet switch should forward packets having the forwarding MAC address as their destination MAC address; and in response to said receipt of the flood prevention request message: determining, based on said one or more destination MAC addresses, which one or more ports but less than all of the plurality of ports the packet switch should forward a packet having the forwarding MAC address as its destination MAC address in order to reach said routers; and updating one or more forwarding data structures within the packet switch correlating the forwarding MAC address with said determined one or more ports but less than all of the plurality of ports for use in forwarding subsequently received packets having the forwarding MAC address as their destination address.

4. The method of claim 3, wherein for each particular packet of a plurality of particular packets: receiving said particular packet including the forwarding MAC address as its destination MAC address; performing one or more lookup operations on said one or more forwarding data structures based on the forwarding MAC address to identify said determined one or more ports but less than all of the plurality of ports, and forwarding said particular packet from said determined one or more ports but less than all of the plurality of ports.

5. The method of claim 3, wherein said determined one or more ports but less than all of the plurality of ports consists of exactly one port.

6. The method of claim 3, wherein said determined one or more ports but less than all of the plurality of ports comprises two or more ports.

7. A packet switch comprising:

a plurality of ports for communicating with a plurality of routers, one or more forwarding data structures;

one or more processors; and memory;

wherein the packet switch is configured to receive a flood prevention request message from an upstream router on one of the plurality of ports; wherein the flood prevention request message specifies both a forwarding media access control (MAC) address and a plurality of destination MAC addresses; wherein the forwarding MAC address identifies a MAC address to be subsequently used as the destination MAC address of packets; and wherein the plurality of destination MAC addresses identify a plurality of routers to which the packet switch should forward packets having the forwarding MAC address as their destination MAC address; and herein each of the plurality of destination MAC addresses is a MAC address of one of the plurality of routers; and wherein the packet switch is configured: to determine, in response to said receipt of the flood prevention request message and based on the plurality of destination MAC addresses, which one or more ports but less than all of the plurality of ports the packet switch should forward a packet having the forwarding MAC address as its destination MAC address in order to reach the plurality of routers; and to update said one or more forwarding data structures within the packet switch correlating the forwarding MAC address with said determined one or more ports but less than all of the plurality of ports for use in forwarding subsequently received packets having the forwarding MAC address as their destination address.

8. The packet switch of claim 7, wherein the packet switch is configured to receive each particular packet of a plurality of particular packets including the forwarding MAC address as its destination MAC address; perform one or more lookup operations on said one or more forwarding data structures based on the forwarding MAC address to identify said determined one or more ports but less than all of the plurality of ports, and forward said particular packet from said determined one or more ports but less than all of the plurality of ports.

9. The packet switch of claim 7, wherein said determined one or more ports but less than all of the plurality of ports consists of exactly one port.

10. The packet switch of claim 7, wherein said determined one or more ports but less than all of the plurality of ports comprises two or more ports.

11. A packet switch, comprising: a plurality of ports for communicating with a plurality of routers; means for receiving a flood prevention request message from an upstream router on one of the plurality of ports; wherein the flood prevention request message specifies both a forwarding media access control (MAC) address and a plurality of destination MAC addresses; wherein each of the plurality of destination MAC addresses is a MAC address of one of the plurality of routers; wherein the forwarding MAC address identifying is a MAC address to be subsequently used as the destination MAC address of packets, packets; and wherein each of the plurality of destination MAC addresses identifies one of the plurality routers to which the packet switch should forward packets having the forwarding MAC address as their destination MAC address; means for determining based on said one or more destination MAC addresses which one or more ports but less than all of the plurality of ports the packet switch should forward a packet having the forwarding MAC address as its destination MAC address in order to reach said routers; and means for updating one or more forwarding data structures within the packet switch correlating the forwarding MAC address with said determined one or more ports but less than all of the plurality of ports for use in forwarding subsequently received packets having the forwarding MAC address as their destination address.

12. The packet switch of claim 11, comprising: means for receiving each of a plurality of particular packets including the forwarding MAC address as its destination MAC address; means for performing one or more lookup operations on said one or more forwarding data structures based on the forwarding MAC address to identify said determined one or more ports but less than all of the plurality of ports; and means for forwarding each of the plurality of particular packets from said determined one or more ports but less than all of the plurality of ports.

13. The packet switch of claim 11, wherein said determined one or more ports but less than all of the plurality of ports consists of exactly one port.

14. The packet switch of claim 11, wherein said determined one or more ports but less than all of the plurality of ports comprises two or more ports.

15. The packet switch of claim 11, wherein said means for updating one or more forwarding data structures within the packet switch correlating the forwarding MAC address with said determined one or more ports but less than all of the plurality of ports includes means for associating the forwarding MAC address with different sets of one or more ports but less than all of the plurality of ports; and wherein said means for performing one or more lookup operations on said one or more forwarding data structures based on the forwarding MAC address to identify said determined one or more ports but less than all of the plurality of ports includes means for correctly identifying the correct set of said different sets of one or more ports but less than all of the plurality of ports from which to send said each received packet of the plurality of particular packets.

16. A method, comprising:
performing operations by an upstream router in a multicast tree; wherein said operations include:
in response to recognizing that multicast traffic is to be sent to each of a plurality of downstream routers via a same port of the router through a packet switch, sending a flood prevention request message to the packet switch; wherein the flood prevention request message specifies both a forwarding media access control (MAC) address and a plurality of destination MAC addresses; wherein each of the plurality of destination MAC addresses is a MAC address of one of the plurality of downstream routers; wherein the forwarding MAC address is a MAC address to be subsequently used as the destination MAC address of packets; and wherein each of the plurality of destination MAC addresses identifies one of the plurality the plurality of downstream routers to which the packet switch should forward packets having the forwarding MAC address as their destination MAC address; and
sending each particular packet of a plurality of particular packets from the port, said particular packet including as its destination address the forwarding MAC address.

* * * * *

UNITED STATES PATENT AND TRADEMARK OFFICE
CERTIFICATE OF CORRECTION

| | | |
|---|---|---|
| PATENT NO. | : 8,116,310 B2 | Page 1 of 1 |
| APPLICATION NO. | : 11/986583 | |
| DATED | : February 14, 2012 | |
| INVENTOR(S) | : Boers et al. | |

It is certified that error appears in the above-identified patent and that said Letters Patent is hereby corrected as shown below:

Col. 11, line 16, delete "identifying"

Col. 11, line 17, replace "packets, packets;" with -- packets; --

Signed and Sealed this
Third Day of April, 2012

David J. Kappos
*Director of the United States Patent and Trademark Office*